United States Patent
Shimoda

(10) Patent No.: US 7,331,170 B2
(45) Date of Patent: Feb. 19, 2008

(54) EXHAUST EMISSION CONTROL DEVICE

(75) Inventor: Masatoshi Shimoda, Tokyo (JP)

(73) Assignee: Hino Motors, Ltd., Tokyo (JP)

( * ) Notice: Subject to any disclaimer, the term of this patent is extended or adjusted under 35 U.S.C. 154(b) by 0 days.

(21) Appl. No.: 10/557,850

(22) PCT Filed: May 21, 2004

(86) PCT No.: PCT/JP2004/006959

§ 371 (c)(1),
(2), (4) Date: Nov. 21, 2005

(87) PCT Pub. No.: WO2004/104385

PCT Pub. Date: Dec. 2, 2004

(65) Prior Publication Data

US 2006/0288689 A1  Dec. 28, 2006

(30) Foreign Application Priority Data

May 22, 2003 (JP) .............................. 2003-144716
May 30, 2003 (JP) .............................. 2003-154155

(51) Int. Cl.
*F01N 3/00* (2006.01)
(52) U.S. Cl. ............................ 60/286; 60/275; 60/295; 60/297; 60/303; 422/186.04; 422/186.22
(58) Field of Classification Search ................ 60/274, 60/275, 286, 295, 297, 303, 311; 422/186.04, 422/186.07, 186.21, 186.22, 186.03
See application file for complete search history.

(56) References Cited

U.S. PATENT DOCUMENTS 6,038,854 A * 3/2000 Penetrante et al. ........... 60/297
6,775,972 B2 * 8/2004 Twigg et al. ................. 60/275
6,938,409 B2 * 9/2005 Birckigt et al. .............. 60/275
6,955,041 B2 * 10/2005 Takeshima et al. ........... 60/275
6,959,542 B2 * 11/2005 Taylor et al. ................. 60/295
7,043,902 B2 * 5/2006 Nakanishi et al. ............ 60/286

FOREIGN PATENT DOCUMENTS

| JP | 2002-256853 | 9/2002 |
|----|-------------|--------|
| JP | 2002-266626 | 9/2002 |
| JP | 2002-276333 | 9/2002 |
| JP | 2002-339731 | 11/2002 |
| JP | 2002-349240 | 12/2002 |
| JP | 2002-364436 | 12/2002 |
| WO | 02/066813 | 8/2002 |

* cited by examiner

*Primary Examiner*—Binh Q. Tran
(74) *Attorney, Agent, or Firm*—Oblon, Spivak, McClelland, Maier & Neustadt, P.C.

(57) ABSTRACT

Provided is an exhaust emission control device which can properly burn off soot and soluble organic fraction attached to and accumulated on electrodes of a plasma generator. The exhaust emission control device with a post-processing device (catalyst regenerative particulate filter) for allowing exhaust gas to pass therethrough for gas purification incorporated in an exhaust pipe of an internal combustion engine (diesel engine) comprises a plasma generator arranged upstream of the post-processing device for discharging electricity in the exhaust gas to generate plasma, flow-through type oxidation catalyst arranged upstream of the plasma generator, fuel adding means (controller) arranged upstream of the oxidation catalyst for adding fuel into the exhaust gas, temperature increasing means (suction throttling valve or controller) for increasing the exhaust temperature to a level enough for oxidation reaction on the oxidation catalyst of the fuel added by said fuel adding means.

16 Claims, 5 Drawing Sheets

EXHAUST EMISSION CONTROL DEVICE

TECHNICAL FIELD

The present invention relates to an exhaust emission control device.

BACKGROUND ART

Particulates or particulate matter emitted or discharged from a diesel engine is mainly constituted by carbonic soot and a soluble organic fraction (SOF) of high-boiling hydrocarbons, and contains a trace of sulfate (misty sulfuric acid fraction). In order to reduce emission of particulates from the engine, a particulate filter is conventionally employed and incorporated into an exhaust pipe through which the exhaust gas flows.

This kind of particulate filter is a porous honeycomb structure made of ceramics such as cordierite and having lattice-like compartmentalized passages; alternate ones of the passages having plugged inlets and the remaining passages having unplugged open inlets which are plugged at their outlets. Thus, only the exhaust gas passing through the compartment walls is discharged downstream.

The particulates in the exhaust gas, which are captured by and accumulated on the compartment walls of the particulate filter, are required to be burned off to regenerate the particulate filter before exhaust resistance considerably increases due to clogging. However, the exhaust from the diesel engine in a normal operating status rarely has a chance to reach a temperature level at which the particulates ignite by themselves. Then, to employ a catalytic regenerative particulate filter has been investigated which integrally carries oxidation catalyst made from platinum-carrying alumina or in which separate oxidation catalyst is arranged upstream of the particulate filter.

Thus, such employment of the catalyst regenerative particulate filter accelerates the oxidation reaction of the captured particulates and lowers ignition temperature thereof, whereby the particulates can be burned off at an exhaust temperature lower than ever before.

Other than the above-mentioned particulate filter, a post-processing device such as selective reduction or $NO_x$-occlusion reduction catalyst for removal of $NO_x$ in exhaust gas has been proposed to be incorporated in an exhaust pipe; in particular, recently, a post-processing device in the form of a combination of a particulate filter with $NO_x$-occlusion reduction catalyst has been developed.

However, whenever any of these post-processing devices is employed, an exhaust temperature above a predetermined level is required for assured burning-off of particulates and for obtaining enough catalytic activities. Thus, if an operating status with lower exhaust temperature (generally speaking, a region with lower exhaust temperature extends in a light-load operating region) continues, the post-processing device cannot work well and in a case of, for example, a city shuttle-bus which tends to travel on congested roads, operation above a predetermined temperature requirement does not continue for a long time, resulting in the possibility of insufficiently obtaining the exhaust emission control effect due to provision of a post-processing device.

To overcome this problem, there has been investigated arranging a plasma generator upstream of the post-processing device so as to obtain enough exhaust emission control effect due to the post-processing device even in an operating region with lower exhaust temperature. To discharge electricity by such plasma generator in the exhaust gas upstream of the post-processing device to generate plasma excites the exhaust gas and changes unburned hydrocarbon, oxygen and NO into an activated radical, ozone and $NO_2$, respectively. Because of these exhaust gas excited components being active, exhaust emission control effect due to the post-processing device can be obtained even in a region with exhaust temperature lower than ever before.

As to an exhaust emission control device with a plasma generator arranged upstream of a particulate filter, the following Reference 1 is known as the prior art.

[Reference 1] JP 2002-276333A

SUMMARY OF THE INVENTION

[Problems to be Solved by the Invention]

However, electrodes of such plasma generator are exposed to exhaust gas flow having the particulates entrained thereon, so that carbonic soot and SOF may be attached to and accumulated on the electrodes to cause leakage of current, resulting in difficulty in applying voltage across the electrodes and in hindrance of the generation of plasma.

The present invention was made in view of the above and has as its object to provide an exhaust emission control device which can properly burn off soot and a soluble organic fraction attached to and accumulated on electrodes of a plasma generator.

The invention also deals with arrangement of this kind of plasma generator upstream of a post-processing device and provides an optimum contrivance structure which is directed to concurrent reduction in amount of particulates as well as of $NO_x$ and which can attain assured regeneration of a particulate filter and satisfactory $NO_x$ reduction effect even in a driving state with lower exhaust temperature.

[Means or Measure for Solving the Problems]

The invention is directed to an exhaust emission control device with a post-processing device for allowing exhaust gas to pass therethrough for gas purification incorporated in an exhaust pipe of an internal combustion engine, characterized in that it comprises a plasma generator arranged upstream of the post-processing device for discharging electricity into the exhaust gas to generate plasma, flow-through type oxidation catalyst arranged upstream of the plasma generator, fuel adding means arranged upstream of the oxidation catalyst for adding fuel in the exhaust gas and temperature increasing means for increasing exhaust temperature to a level enough for oxidation reaction on the oxidation catalyst of the fuel added by the fuel adding means.

Thus, to discharge electricity in the exhaust gas by the plasma generator excites the exhaust gas and changes unburned hydrocarbon, oxygen and NO into activated radical, ozone and $NO_2$, respectively, these exhaust gas excited components being active to thereby obtain exhaust emission control effect due to the post-processing device even in a region with exhaust temperature lower than ever before.

When the soot and SOF in the exhaust gas attached to and accumulated on the electrodes of the plasma generator are to be removed, fuel is added upstream of the oxidation catalyst by fuel adding means. This added fuel makes oxidation reaction through oxidation catalyst to generate reaction heat which substantially increases the temperature of the exhaust gas passing through the oxidation catalyst. As a result, the exhaust gas increased in temperature through the oxidation catalyst is introduced into the plasma generator, leading to burn-off of the soot and SOF attached to and accumulated on the electrodes of the plasma generator.

If operation is being conducted in an operating region with too low an exhaust temperature to oxidize the fuel on the oxidation catalyst, the exhaust temperature may be properly increased by the temperature increasing means before fuel is added by the fuel adding means.

On practicing the exhaust emission control device of the invention more concretely, preferably a temperature sensor for detecting the exhaust temperature is arranged between the oxidation catalyst and the plasma generator, fuel being added properly by the fuel adding means only on a condition that a detected value of the temperature sensor exceeds a predetermined threshold. When the detected value of the temperature sensor is below the threshold, an increase in the temperature of the exhaust gas may be properly conducted by the temperature increasing means before the fuel addition by the fuel adding means.

In the invention, the fuel adding means is preferably fuel injection control means which may cause a fuel injection unit to conduct post-injection following the main injection and with non-ignition timing after a compressive top dead center.

The temperature increasing means may be suction throttling means for properly throttling the suction flow rate. Alternatively, it may be fuel injection control means which may cause the fuel injection unit to control the main injection with a timing delayed within a combustible range to a normal injection or which may cause the fuel injection unit to conduct post-injection with a combustible timing just after the main injection.

When the temperature increasing means is the suction throttling means for properly throttling the suction flow rate, such throttling of the suction flow rate by the suction throttling means in an operating status with lower exhaust temperature causes the working air quantity in the internal combustion engine to be reduced to increase the pumping loss, whereby the exhaust temperature is increased by increasing the injected fuel amount so as to generate any required output. Reduction in generated exhaust gas amount by the combustion in the internal combustion engine and resultant lowering of the heat capacity contribute to further increase in the exhaust temperature.

When the temperature increasing means is the fuel injection control means and the fuel injection unit is caused to conduct the main injection with the timing delayed within the combustible range to the normal injection, fuel of the delayed main injection is burned with timing hardly convertible into output to lower the heat efficiency in the internal combustion engine and increase the heat quantity not used as motive energy in the heat release value of the fuel, thereby increasing the exhaust temperature.

When the temperature increasing means is the fuel injection control means and the fuel injection unit is caused to conduct post-injection with a combustible timing just after the main injection, the fuel of the post-injection is burned with timing hardly convertible into output to lower the heat efficiency of the internal combustion engine and increase a heat quantity not used as motive energy among a heat release value of the fuel, thereby increasing the exhaust temperature.

It is preferable in the invention to provide judgment means for determining whether fuel addition is required or not through monitoring at least either of current and voltage upon generation of plasma by the plasma generator to judge any generation of leakage, which makes it possible to avert any and all wasteful fuel addition.

When the catalyst regenerative particulate filter is incorporated as a post-processing device in the exhaust pipe, it is preferable that a $NO_x$ reduction catalyst for reductive purification of $NO_x$ in the exhaust gas is provided downstream of the particulate filter and that a plasma generator for generating plasma through electric discharge in the exhaust gas is provided upstream of the particulate filter, the plasma generator being actuated in an operating status with lower exhaust temperature.

In such a case, electric discharging in the exhaust gas by the plasma generator in an operating status with lower exhaust temperature excites the exhaust gas to generate active radical and change NO into $NO_2$; because of these exhaust gas excited components being active, an oxidation reaction of the particulates captured on the particulate filter is accelerated by the exhaust gas excited components, whereby the particulates are burned off well even in an operating status with lower exhaust temperature.

Furthermore, the relatively stable exhaust gas excited components such as $NO_2$ redundant from the oxidation reaction of the captured particulates flow into the downstream $NO_x$ reduction catalyst as they are, $NO_x$ being efficiently reduced in the $NO_x$ reduction catalyst.

When the $NO_x$ reduction catalyst is for example $NO_x$-occlusion reduction catalyst, electric discharge by the plasma generator causes NO, which occupies the majority of $NO_x$ in the exhaust gas, to be changed into highly responsive $NO_2$ which flows into the $NO_x$-occlusion reduction catalyst; as a result, such $NO_2$ is effectively occluded in the state of nitrate so that occlusion reaction of $NO_x$ in the $NO_x$-occlusion reduction catalyst is remarkably accelerated, resulting in obtaining $NO_x$ reduction effect higher than that obtained in a case where no plasma assist is conducted.

When the occluded $NO_x$ is to be decomposed and discharged, for example post-injection may be conducted at the engine side to add fuel in the exhaust gas, which will lower the oxygen concentration in the exhaust gas and increase reduction components in the exhaust gas such as unburned hydrocarbon and CO to accelerate decomposition and discharge of $NO_x$.

In this case, the unburned hydrocarbon is reacted with oxygen through the oxidation catalyst on the upstream particulate filter to be thermally decomposed into CO and hydrogen; such increase of CO and hydrogen remarkably accelerates decomposition and discharge reaction of $NO_x$ from $NO_x$-occlusion reduction catalyst as well as reductive purification reaction of $NO_x$.

When the $NO_x$ reduction catalyst is a selective reduction catalyst, NO which occupies the majority of $NO_x$ in the exhaust gas is changed by electric discharge by the plasma generator into highly reactive $NO_2$ which flows to the selective reduction catalyst. Thus, when an addition device is arranged upstream of the selective reduction catalyst to add a reducer such as urea into the exhaust gas, $NO_2$ is effectively reduced into $N_2$ through selective reduction catalyst; as a result, obtained is $NO_x$ reduction effect higher than that obtained in a case where no plasma assist is conducted.

In practicing the invention more concretely, it is preferable to provide a temperature sensor for detecting the exhaust temperature and a controller for actuating the plasma generator on the basis of the detection signal from the temperature sensor when the exhaust temperature detected is below a predetermined value; the controller may be constructed such that it may optimize generated plasma amount depending upon the exhaust temperature upon actuation of the plasma generator.

[Effects of the Invention]

According to the above-mentioned exhaust emission control device of the invention, the following various excellent meritorious effects will be obtained:

(I) According to an aspect of the invention, after the exhaust temperature may be increased as needs demand by temperature increasing means, fuel is added to the exhaust gas by the fuel adding means. The added fuel is oxidized through the oxidation catalyst and a resultant reaction heat substantially increases the temperature of the exhaust gas passing through the oxidation catalyst. This exhaust gas is introduced into the plasma generator to burn off the soot and SOF attached to and accumulated on the electrodes, so that preliminarily prevented is leakage of the current due to the soot and SOF attached to and accumulated on the electrodes, whereby proper voltage is applied with no hindrance across the electrodes to maintain well generation of plasma.

(II) On the basis of the detected value of the temperature sensor, the fuel adding means and temperature increasing means can be properly operated to efficiently burn off the soot and SOF attached to the electrodes of the plasma generator.

(III) Merely conducted is controlling the fuel injection unit so as to cause it to conduct post-injection following the main injection and with non-ignition timing later than a compressive top dead center, which make it possible to add unburned fuel to the exhaust gas with no need of new facilities annexed, thereby suppressing a runup of cost on fuel adding means.

(IV) The working air quantity in the internal combustion engine is reduced to increase pumping loss; and exhaust gas to be generated in the combustion in the internal combustion engine is reduced to lower the heat capacity. As a result, the temperature of the exhaust gas to the oxidation catalyst can be surely increased.

(V) Fuel of the delayed main injection is burned with timing hardly convertible into output, so that the heat efficiency of the internal combustion engine is lowered to increase heat quantity not utilized for motive energy among the heat release value of the fuel, whereby the temperature of the exhaust gas to the oxidation catalyst can be surely increased.

(VI) The fuel of the post-injection is burned with timing hardly convertible to output, so that the heat efficiency of the internal combustion engine is lowered to increase heat quantity not utilized as motive energy among heat release value of the fuel, whereby the temperature of the exhaust gas to the oxidation catalyst can be surely increased.

(VII) Any and all wasteful fuel addition is averted so that cost for fuel addition can be suppressed to requisite minimum.

(VIII) According to a further aspect of the invention, a particulate filter is reliably regenerated even in an operating status with lower exhaust temperature and good $NO_x$ reduction effect is obtained by the $NO_x$ reduction catalyst; moreover, any and all undue wasteful plasma generation is averted to substantially suppress electricity consumption.

BEST MODE FOR CARRYING OUT THE INVENTION

Embodiments of the invention will be described with reference to the drawings.

FIGS. 1 to 3 show an embodiment of the invention. In FIG. 1, reference numeral 1 designates a diesel engine (internal combustion engine) with a turbocharger 2. Suction air 4 sucked through an air cleaner 3 is guided via a suction pipe 5 to a compressor 2a of the turbocharger 2 so as to compress the same, the compressed suction air 4 being passed through an intercooler 6 and being distributed to respective cylinders of the diesel engine 1.

Exhaust gas 8 discharged via an exhaust manifold 7 from the respective cylinders of the diesel engine 1 is fed to a turbine 2b of the turbocharger 2; the exhaust gas 8 having driven the turbine 2b is passed through a catalyst regenerative particulate filter 10 (post-processing device) for capturing of particulates and is discharged.

As shown in FIG. 2 on an enlarged scale, the particulate filter 10 is a porous honeycomb structure made of ceramics having lattice-like compartmentalized passages 10a; alternate ones of the passages 10a have plugged inlets and the remaining passages 10a with unplugged open inlets are plugged at their outlets. Thus, only the exhaust gas 8 passing through the porous compartment walls 10b is discharged downstream.

Arranged upstream of the particulate filter 10 is a plasma generator 11 which discharges electricity in the exhaust gas 8 to generate plasma. Arranged upstream of the plasma generator 11 is flow-through type oxidation catalyst 12 with a honeycomb structure shown in an enlarged scale in FIG. 3.

The plasma generator 11 has electrodes 13 and 14 arranged oppositely to each other for possible mutual electric discharge. The electrodes 13 and 14 may be of any combination of any shapes such as plate, rod or cylinder, provided that mutual distances between them can be set to be substantially uniform.

Each of the electrodes 13 and 14 is connected through an electric discharge controller 15 to a power supply 16; particularly in the present embodiment, the power supply 16 is assumed to be an in-vehicle cell, so that the voltage of the power supply 16 is enhanced by the discharge controller 15 to a voltage capable of discharging electricity and is supplied across the respective electrodes 13 and 14. The discharge controller 15 is controlled by a command signal 15a from a controller 17 which is an engine control computer or electronic control unit (ECU).

Arranged between the oxidation catalyst 12 and the plasma generator 11 is a temperature sensor 18 for detecting exhaust temperature, a detection signal 18a from the sensor 18 being inputted to the controller 17.

The controller 17, which serves as ECU, also takes control of fuel injection. More specifically, a fuel injection signal 21a is outputted to a fuel injection unit 21 which injects fuel to respective cylinders of the diesel engine 1 on the basis of an accelerator stepped-on degree signal 19a from an accelerator stepped-on degree sensor 19 (load sensor) which detects an accelerator stepped-on degree as a load to the diesel engine 1 as well as an engine revolution speed signal 20a from a revolution speed sensor 20 which detects revolution speed of the engine 1.

The fuel injection unit 21 comprises a plurality of injectors each for each of the cylinders, an electromagnetic valve of each of the injectors being controlled for valve opening by the fuel injection signal 21a so that fuel injection timing (valve opening timing) and fuel injected amount (valve opening time) are properly controlled.

In the controller 17, a fuel injection signal 21a in a normal mode is determined on the basis of an accelerator stepped-on degree signal 19a and revolution speed signal 20a. When fuel addition by post-injection is required, the fuel injection signal 21a is determined such that changeover is effected from the normal mode to electrode regeneration mode where post-injection is conducted with non-ignition timing followed by the main injection conducted near a compressive top dead center (crank angle of 0°).

Thus, when the post-injection is conducted with non-ignition timing later than the compressive top dead center after the main injection, this post-injection adds unburned fuel (mainly, hydrocarbon) in the exhaust gas 8, such unburned fuel being oxidized through the oxidation catalyst 12 to generate reaction heat which substantially increases the temperature of the exhaust gas 8 passing through the oxidation catalyst 12.

The controller 17 serves for conducting fuel addition in the form of post-injection, based on the detection signal 18a from the temperature sensor 18, only in a condition that the temperature (predetermined threshold) which enables oxidation reaction on the oxidation catalyst 12 of fuel added by the post-injection is exceeded. If not, fuel addition in the form of the post-injection is conducted after the exhaust temperature is increased by the temperature increasing means (referred to hereinafter).

More specifically, in the example illustrated, an action is generated by the opening degree command signal 22a from the controller 17 to the suction throttling valve 22 (suction throttling means) incorporated in the suction valve 5, which action is different from an inherent action for the suction throttling valve 22 and is for utilization of the valve as temperature increasing means for increasing the exhaust temperature. When the throttling of the suction flow rate is conducted by the suction throttling valve 22 in the driving state with lower exhaust temperature, the working air quantity in the diesel engine 1 is reduced to increase pumping loss, whereby the exhaust temperature is increased by increasing the injected fuel amount so as to generate any required output. Reduction in generated exhaust gas 8 amount by the combustion in the diesel engine 1 and resultant lowering of the heat capacity contribute to further increase in the exhaust temperature.

Alternatively, the controller 17, which serves also as fuel injection control means, may be utilized as the temperature increasing means for increasing the exhaust temperature. More specifically, the fuel injection unit 21 is caused to conduct the main injection with the timing delayed in a combustible range by the controller 17 to the normal injection; alternatively, the fuel injection unit 21 is caused to conduct post-injection with the combustible timing just after the main injection.

More specifically, when the main injection is conducted with timing delayed within the combustible range to the normal injection, fuel in the delayed main injection is burned with a timing hardly convertible into an output so that the heat efficiency of the diesel engine 1 is lowered and heat quantity not utilized as motive energy among the heat release value of the fuel is increased to increase the exhaust temperature.

When the post-injection is conducted with the combustible timing just after the main injection, the fuel of the post-injection is burned with a timing hardly convertible into an output so that heat efficiency of the diesel engine 1 is lowered and heat quantity not utilized as motive energy among the heat release value of fuel is increased to increase the exhaust temperature.

The above-mentioned temperature increasing means is controlled on the basis of the detection signal 18 indicative of whether exceeded is a threshold or critical temperature above which added fuel cannot be oxidized on the oxidation catalyst 12. When the threshold is not exceeded, the temperature increasing mode is conducted to actuate the temperature increasing means before the electrode regeneration mode for conducting the post-injection; whereas, on the condition that the detected value of the temperature sensor 18 exceeds the predetermined threshold, changeover is effected to the electrode regeneration mode where the post-injection is conducted.

Thus, with the exhaust emission control device constructed in this manner, electricity is discharged into the exhaust gas 8 by the plasma generator 11 to excite the exhaust gas 8 so that unburned hydrocarbon, oxygen and NO are changed into activated radical, ozone and $NO_2$, respectively. With these exhaust excited components being active, the oxidation reaction of particulates captured on the particulate filter 10 is accelerated by the exhaust excited components, whereby the particulates may be ignited to be burned off even with exhaust temperature lower than ever before.

When the soot and SOF entrained in the exhaust gas 8 are attached to and accumulated on the electrodes 13 and 14 of the plasma generator 11 and the soot and SOF attached thereon are to be removed, the electrode regeneration mode is selected on the condition that the detected value of the temperature sensor 18 exceeds the predetermined threshold,; that is, fuel injection pattern is changed over by the controller 17 from the normal mode to the electrode regeneration mode so that adopted is an injector pattern according to which post-injection follows the main injection and with non-ignition timing later than a compressive top dead center. As a result, the fuel added by the post-injection to the exhaust gas 8 while being unburned is oxidized on the oxidation catalyst 12 to generate reaction heat. This reaction heat substantially increases the temperature of the exhaust gas 8 passing through the oxidation catalyst 12; the exhaust gas 8 increased in temperature while passing through the oxidation catalyst 12 is introduced in the plasma generator 11 so that the soot and SOF attached to and accumulated on the electrodes 13 and 14 of the plasma generator 11 are burned off.

Even if the operation is conducted in an operating region with too low an exhaust temperature to oxidize the added fuel on the oxidation catalyst 12, by the controller 17 which receives the detection signal 18a from the temperature sensor 18, the temperature increasing mode is conducted before the electrode regeneration mode, so that the suction throttling valve 22 is throttled to increase the temperature of the exhaust gas 8 passing to the oxidation catalyst 12. Alternatively, the main injection may be delayed within a combustible range to the ordinary injection or post-injection may be conducted with a combustible timing just after the main injection of the fuel.

When the detected value of the temperature sensor 18 exceeds the predetermined threshold and changeover is effected to the electrode regeneration mode, the added fuel can be surely oxidized on the oxidation catalyst 12. The exhaust gas 8 substantially increased in temperature by the reaction heat burns off the soot and SOF attached to and accumulated on the electrodes 13 and 14 of the plasma generator 11.

As to whether soot and SOF attached to the electrodes 13 and 14 of the plasma generator 11 are recquired to be removed or not, for example, voltage and/or current upon plasma generation by the plasma generator 11 may be always monitored by the controller 17 as the judging means to determine whether the leakage is generated or not. Alternatively, post-injection may be conducted regularly on the basis of for example operating time.

Thus, according to the above-mentioned embodiment, the exhaust temperature may be increased by the temperature increasing means such as a suction throttling valve 22 as needs demand and fuel is added to the exhaust gas 8 by post-injection. The added fuel is oxidized on the oxidation catalyst 12 so that the resultant reaction heat substantially increases the temperature of the exhaust gas 8 passing through the oxidation catalyst 12. The exhaust gas 8 is introduced into the plasma generator 11 to burn off the soot and SOF attached to and accumulated on the electrodes 13 and 14, so that preliminarily prevented is leakage of current due to the soot and SOF attached and accumulated, whereby proper voltage is applied with no hindrance across the electrodes 13 and 14 to maintain well generation of plasma.

FIGS. 4-7 show a further embodiment of the invention wherein a catalyst regenerative particulate filter 10 is incorporated as post-processing device into an exhaust pipe 9. Arranged downstream of the particulate filter 10 is flow-through type $NO_x$-occlusion reduction catalyst 23 as $NO_x$ reduction catalyst for reductive purification of $NO_x$ in the exhaust gas 8 (for example, alumina catalyst carrying platinum and barium or alumina catalyst carrying iridium, platinum and barium is known as this kind of $NO_x$-occlusion reduction catalyst 23). Arranged upstream of the particulate filter 10 is a plasma generator 11 similar to that shown in the embodiment of FIGS. 1 to 3.

More specifically, the plasma generator 11 is actuated by the electric discharge controller 15 which receives the command signal 15a from the controller 17. Inputted into the controller 17 is the detection signal 18a from the temperature sensor 18 which detects the exhaust temperature at an entry side of the plasma generator 11. The plasma generator 11 is actuated on the basis of the detection signal 18a when the exhaust temperature is below the predetermined value.

However, actuation of the plasma generator 11 with the exhaust temperature being below the predetermined value is not necessarily requisite. For example, pressure loss of the particulate filter 10 is detected by a pressure sensor to determine a particulate accumulated amount and, only on an occasion that the accumulated amount is judged to be much, the plasma generator 11 may be activated with the exhaust temperature below the predetermined value. The accumulated particulate amount may be momentarily determined by calculation from generated and dealt amounts assumed on the basis of the operating status, or may be judged on the basis of the operating time.

Moreover, particularly in the present embodiment, when the plasma generator 11 is actuated, the generated plasma amount is optimized depending upon the exhaust temperature; more specifically, as shown in the graph of FIG. 5, optimization is carried out in the controller 17 by adjusting voltage, current or frequency so as to increase the generated plasma amount as the exhaust temperature lowers relative to the predetermined value x, whereby superfluous or undue plasma generation is suppressed to suppress electricity consumption to requisite minimum.

Thus, in the operating status with lower exhaust temperature, the command signal 15a is outputted from the controller 17 on the basis of the detection signal 18a from the temperature sensor 18. The electric discharge controller 15 which receives the command signal 15a causes the plasma generator 11 to be actuated to discharge electricity in the exhaust gas 8 so that the exhaust gas 8 is excited to generate active radical and change NO into $NO_2$; because of these exhaust gas excited components being active, the oxidation reaction of the particulates captured on the particulate filter 10 is accelerated by the exhaust gas excited components, whereby the particulates are satisfactorily burned off even in the operating status with lower exhaust temperature.

In fact, verification experiments by the inventor revealed that, as shown in solid line in the graph of FIG. 6, when no plasma assist is conducted (no electric discharge by the plasma generator 11) is conducted, at least 230° C. or so of exhaust temperature is required for combustion of the captured particulates; as shown in dotted line in the graph of FIG. 6, when plasma assist is conducted, even the exhaust temperature lower than 230° C. will suffice for burning-off of the captured particulates with required combustion rate.

Relatively stable exhaust gas excited components such as $NO_2$ redundant from the oxidation reaction of the captured particulates on the particulate filter 10 flow to the downstream $NO_x$-occlusion reduction catalyst 23 as they are, whereby reduction of $NO_x$ is effected on the $NO_x$-occlusion reduction catalyst 23.

More specifically, electric discharge by the plasma generator 11 changes NO, which occupies the majority of $NO_x$ in the exhaust gas 8, into highly reactive $NO_2$ which flows to the $NO_x$-occlusion reduction catalyst 23, so that $NO_2$ is efficiently occluded in the form of nitrite. As a result, occlusion reaction of $NO_x$ on the $NO_x$-occlusion reduction catalyst 23 is remarkably accelerated, whereby obtained is $NO_x$ reduction effect higher than that in a case where no plasma assist is effected.

In fact, verification experiments by the inventor revealed that, as shown in solid line in the graph of FIG. 7, when no plasma assist is conducted, at least 250° C.-300° C. of exhaust temperature is required for development of $NO_x$ reduction ratio; as shown in dotted line in the graph of FIG. 7, when plasma assist is conducted, $NO_x$ reduction ratio is developed even at considerably low exhaust temperature substantially less than 250° C.-300° C.

In order to decompose and discharge the occluded $NO_x$, post-injection or the like may be effected on the side of diesel engine 1 to add fuel in the exhaust gas 8, which lowers the oxygen concentration in the exhaust gas 8 and increases the reduction components in the exhaust gas 8 such as unburned hydrocarbon and CO, thereby accelerating the decomposition and discharge of $NO_x$.

In this case, unburned hydrocarbon is reacted with oxygen on the oxidation catalyst carried by the upstream particulate filter 10 to be thermally decomposed, thereby generating CO and hydrogen. Such increase of CO and hydrogen remarkably accelerates decomposing and discharging reactions of $NO_x$ from the $NO_x$-occlusion reduction catalyst 23 as well as reductive purification reaction of $NO_x$.

Thus, according to the above-mentioned embodiment, the plasma generator 11 is actuated in the operating status with lower exhaust temperature, so that electric discharge by the plasma generator 11 generates highly active exhaust gas excited component in the exhaust gas 8; these exhaust excited components remarkably accelerates the oxidation reaction of the captured particulates as well as $NO_x$ occlusion reaction on the $NO_x$-occlusion reduction catalyst 23, so that even in the operating status with lower exhaust temperature, the particulate filter 10 can be surely regenerated and favorable $NO_x$ reduction effect can be obtained by the $NO_x$-occlusion reduction catalyst 23.

The plasma generator 11 is actuated only in the operating status with lower exhaust temperature. Moreover, at such actuation, the generated plasma amount is optimized depending upon exhaust temperature. As a result, any and all superfluous and unduly plasma generation is averted to substantially suppress the electricity consumption.

In the above-mentioned embodiment with respect to FIGS. 4-7, $NO_x$-occlusion reduction catalyst 23 has been adopted as the $NO_x$ reduction catalyst. In lieu of this $NO_x$-occlusion reduction catalyst 23, selective reduction catalyst with elevated response selectivity between urea and $NO_x$ may be employed; then, electric discharge by the plasma generator 11 causes NO occupying the majority of $NO_x$ in the exhaust gas 8 to be changed into highly reactive NO2 which flows to the selective reduction catalyst. Thus, the addition of urea into the exhaust gas 8 by for example an urea adding device (not shown) arranged upstream of the selective reduction catalyst causes $NO_2$ to be effectively reduced into $N_2$ with the urea being utilized as reducing agent, so that obtained is $NO_x$ reduction effect higher than that in a case where no plasma assist is conducted.

In fact, verification experiments by the inventor revealed that, as shown in solid line in the graph of FIG. 8, when no plasma assist is conducted, at least 200° C.-250° C. or so of exhaust temperature is required for development of $NO_x$ reduction ratio; as shown in dotted line in the graph of FIG. 8, when plasma assist is conducted, $NO_x$ reduction ratio is developed even considerably lower exhaust temperature substantially less than 200° C.-250° C.

Therefore, even in a case where selective reduction catalyst is employed as $NO_x$ reduction catalyst, plasma assist by the plasma generator 11 results in favorable $NO_x$ reduction effect, whereby effects and advantages similar to those obtained in the above embodiments can be obtained.

INDUSTRIAL APPLICABILITY

It is to be understood that an exhaust emission control device according to the invention is not limited to the above-mentioned embodiments and that various changes and modifications may be made within the gist of the invention. For example, with respect to the embodiment shown in FIGS. 1-3, other than the catalyst regenerative particulate filter, selective reduction catalyst or $NO_x$-occlusion reduction catalyst for removal of $NO_x$ in the exhaust gas may be adopted as the post-processing device. The fuel adding means may be in the form of an injector passing through an exhaust pipe at an appropriate position thereof (alternatively, it may pass through an exhaust manifold), the fuel being directly injected by the injector into the exhaust gas for addition of the fuel to the exhaust gas. The three alternative temperature increasing means disclosed in the above-mentioned embodiments may be employed singly or any combination thereof. With respect to the embodiments shown in FIGS. 4-7 and FIG. 8, in lieu of direct measurement of exhaust temperature, number of revolutions and load of an engine are detected to presume an operating status; and the plasma generator may be operated in an operating status presumed to be in an operating region with lower exhaust temperature. When selective reduction catalyst is adopted as $NO_x$ reduction catalyst, a reducing agent other than urea may be employed.

Figure 1:
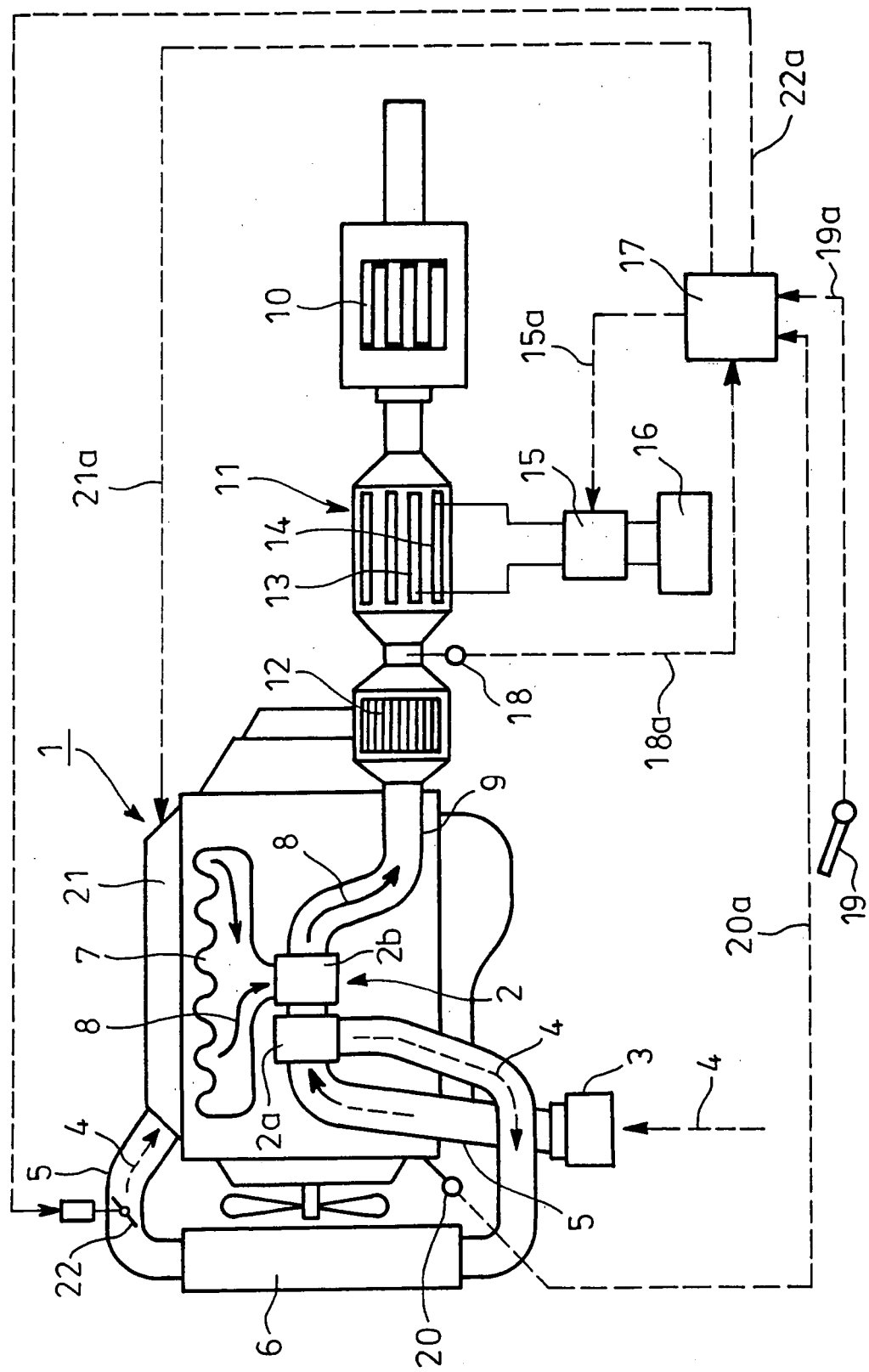
FIG. 1 is a schematic view showing an embodiment of the invention.
Figure 2:
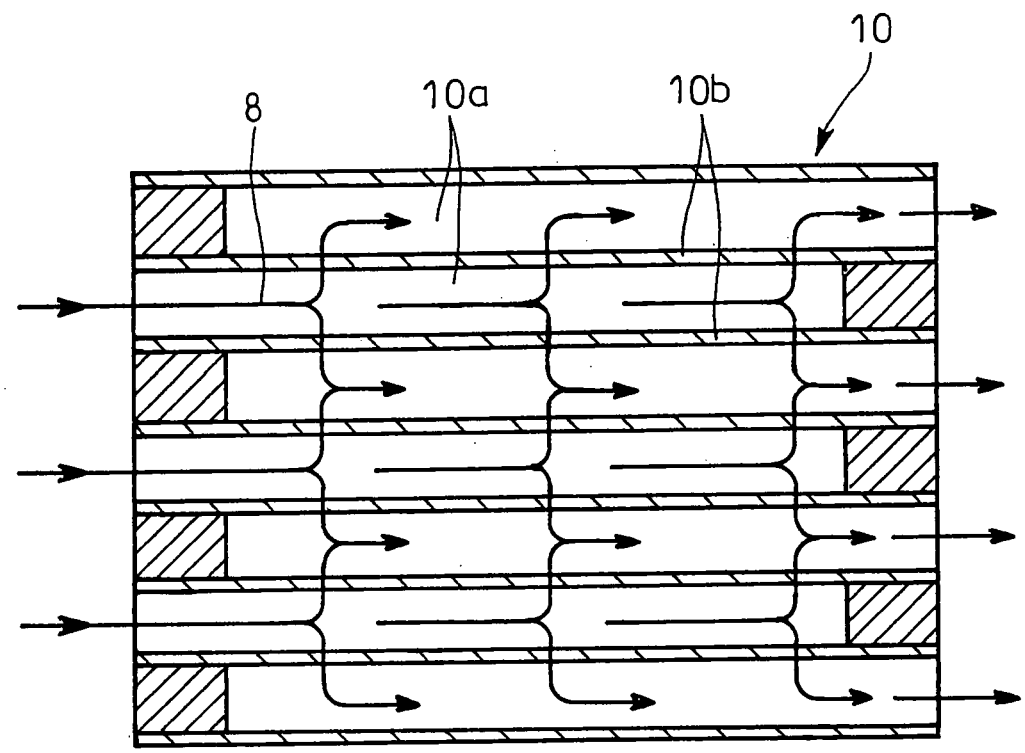
FIG. 2 is a sectional view showing particulars of a particulate filter in FIG. 1.
Figure 3:
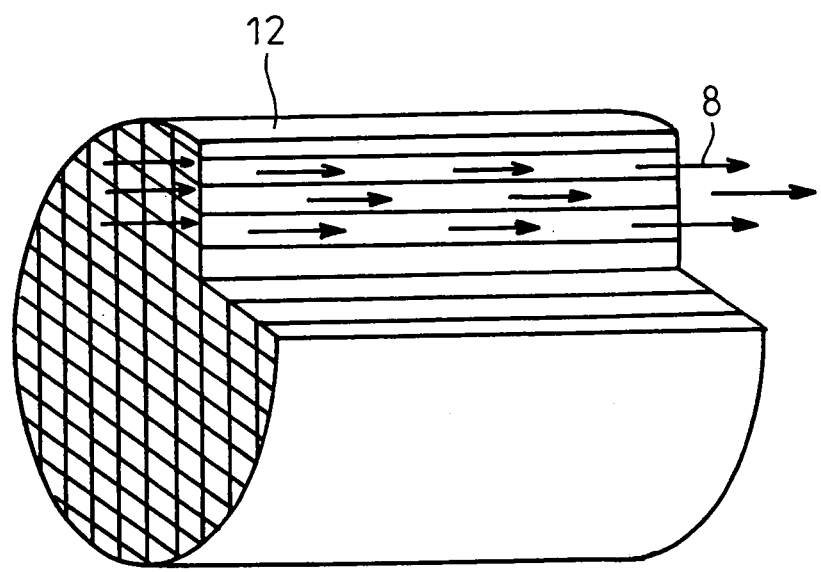
FIG. 3 is a perspective view partly cut out showing particulars of oxidation catalyst in FIG. 1.
Figure 4:
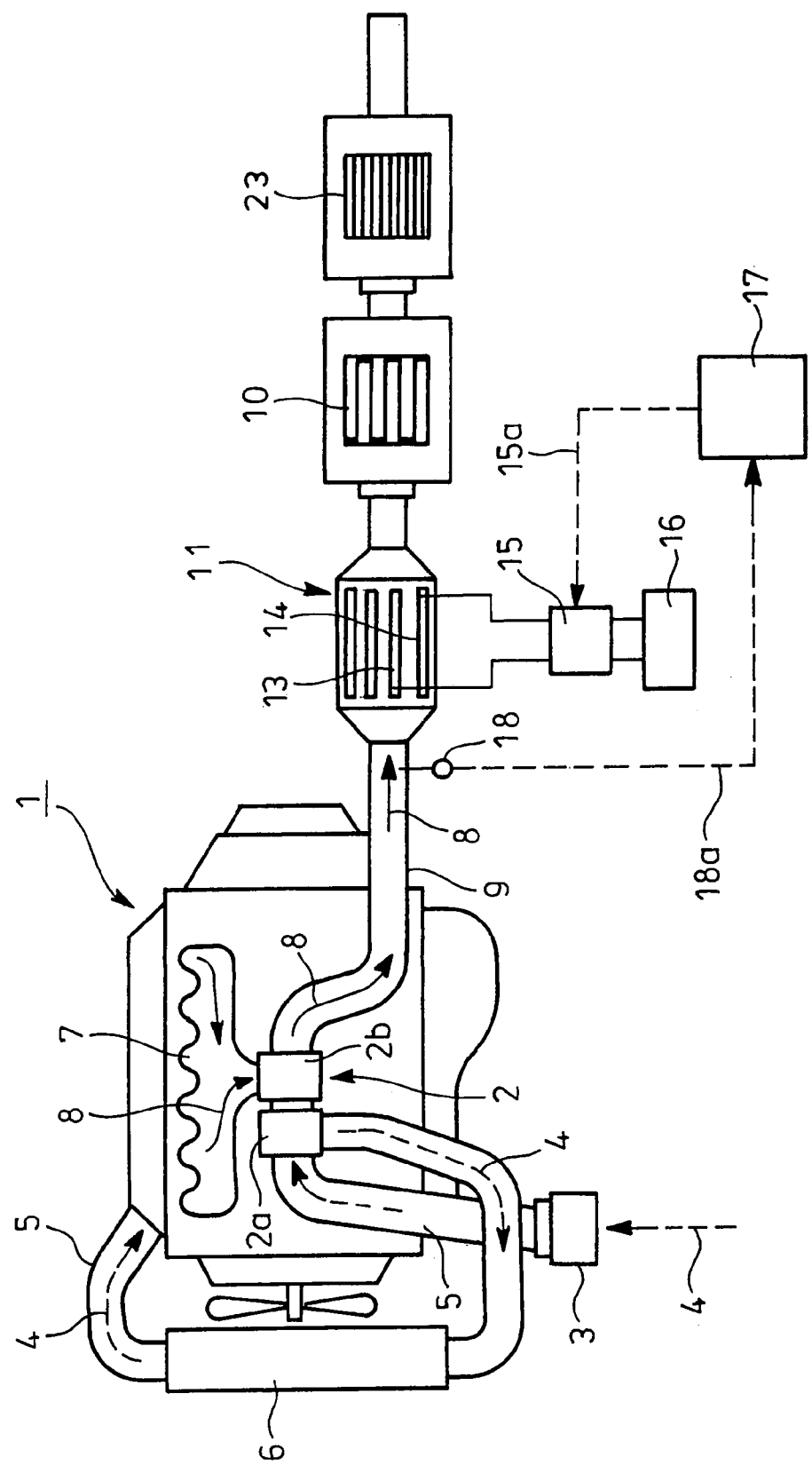
FIG. 4 is a schematic view showing a further embodiment of the invention.
Figure 5:
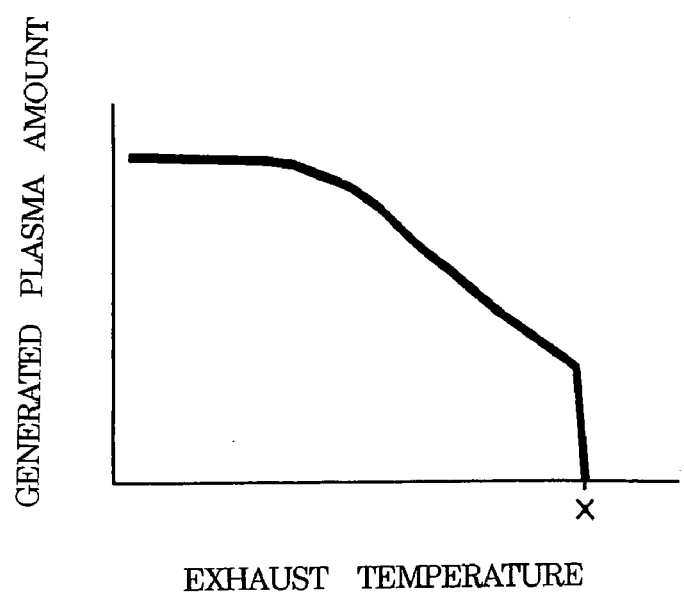
FIG. 5 is a graph showing a relationship between exhaust temperature and generated plasma amount.
Figure 6:
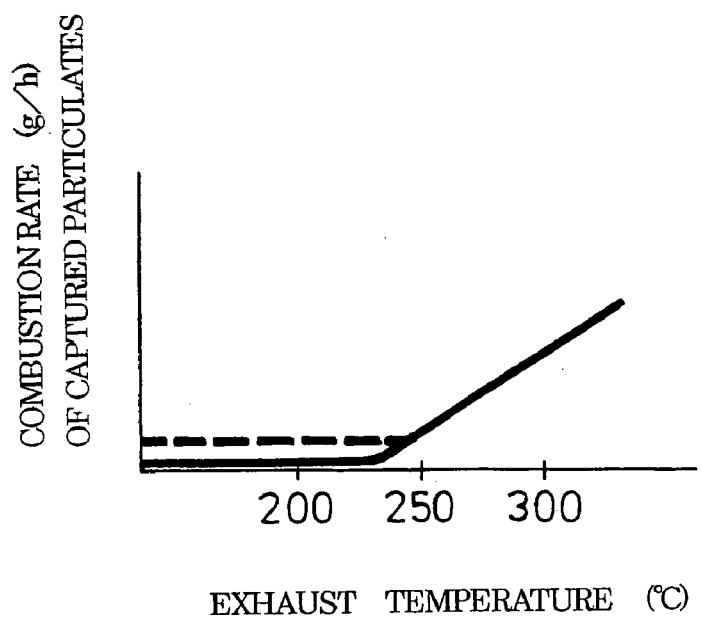
FIG. 6 is a graph showing a relationship between exhaust temperature and combustion rate of captured particulates.
Figure 7:
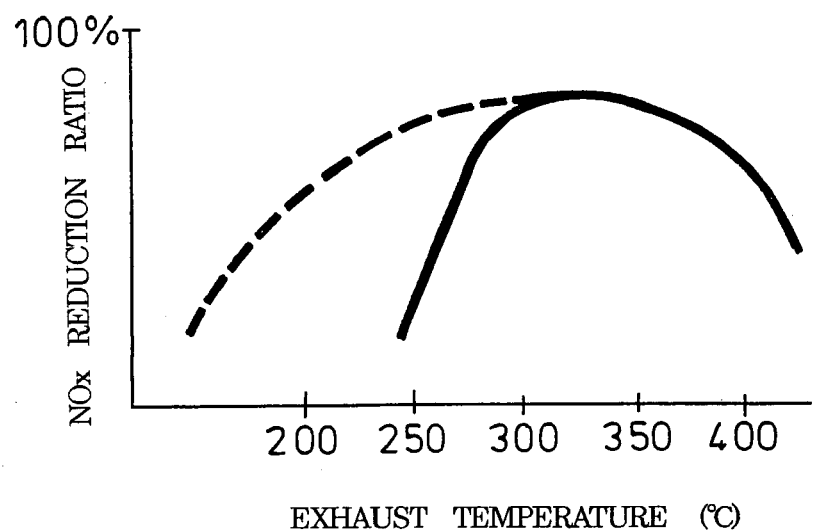
FIG. 7 is a graph showing a relationship between exhaust temperature and $NO_x$ reduction ratio with $NO_x$-occlusion reduction catalyst.
Figure 8:
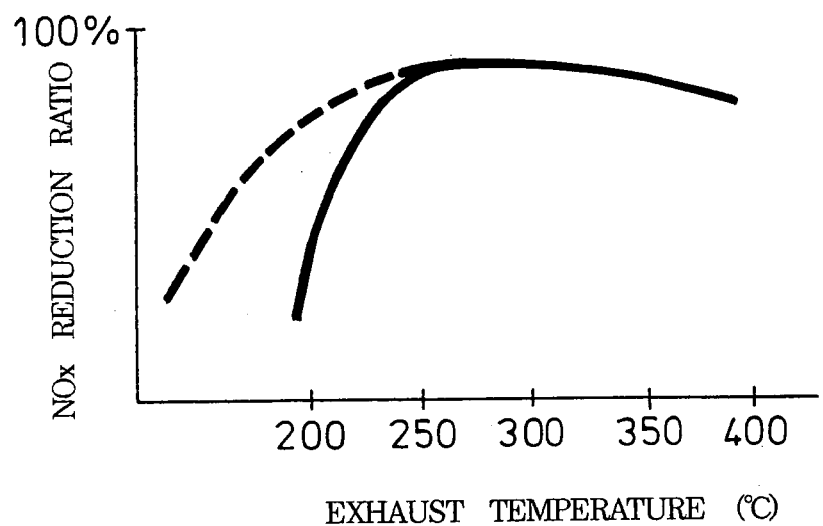
FIG. 8 is a graph showing a relationship between exhaust temperature and $NO_x$ reduction ratio with selective reduction catalyst.

The invention claimed is:

1. An exhaust emission control device with a post-processing device for allowing exhaust gas to pass therethrough for gas purification incorporated in an exhaust pipe of an internal combustion engine, comprising a plasma generator arranged upstream of the post-processing device for discharging electricity into the exhaust gas to generate plasma, flow-through type oxidation catalyst arranged upstream of the plasma generator, fuel adding means arranged upstream of the oxidation catalyst configured for adding fuel in the exhaust gas and temperature increasing means configured for increasing exhaust temperature to a level enough for oxidation reaction on the oxidation catalyst of the fuel added by the fuel adding means; and a temperature sensor arranged between the oxidation catalyst and the plasma generator for detecting exhaust temperature, fuel being added properly by the fuel adding means only on a condition that a detected value of the temperature sensor exceeds a predetermined threshold, the temperature of the exhaust gas being increased by the temperature increasing means before the fuel addition by the fuel adding means on a condition that the detected vale of the temperature sensor is below the predetermined threshold.

2. The exhaust emission control device according to claim 1, wherein the fuel adding means comprises fuel injection control means which causes the fuel injection unit to conduct post-injection followed by the main injection and with non-ignition timing later than a compressive top dead center.

3. The exhaust emission control device according to claim 1, wherein the temperature increasing means for increasing the exhaust temperature comprises suction throttling means for properly throttling suction flow rate.

4. The exhaust emission control device according to claim 2, wherein the temperature increasing means for increasing the exhaust temperature comprises suction throttling means configured for properly throttling suction flow rate.

5. The exhaust emission control device according to claim 1, wherein the temperature increasing means for increasing the exhaust temperature is fuel injection controlling means configured for causing the fuel injection unit to conduct main injection delayed within a combustible range to the normal injection.

6. The exhaust emission control device according to claim 2, wherein the temperature increasing means for increasing the exhaust temperature comprises fuel injection controlling means configured for causing the fuel injection unit to conduct main injection delayed within a combustible range to the normal injection.

7. The exhaust emission control device according to claim 1, wherein the temperature increasing means for increasing the exhaust temperature comprises fuel injection controlling means configured for causing the fuel injection unit to conduct post injection with a combustible timing just after the main injection.

8. The exhaust emission control device according to claim 2, wherein the temperature increasing means for increasing the exhaust temperature comprises fuel injection controlling means configured for causing the fuel injection unit to conduct post injection with a combustible timing just after the main injection.

9. The exhaust emission control device according to claim 1, further comprising judging means configured for determining whether fuel addition is required or not through monitoring at least either of current and voltage upon generation of plasma in the plasma generator.

10. The exhaust emission control device according to claim 2, further comprising judging means configured for determining whether fuel addition is required or not through monitoring at least either of current and voltage upon generation of plasma in the plasma generator.

11. The exhaust emission control device according to claim 3, further comprising judging means configured for determining whether fuel addition is required or not through monitoring at least either of current and voltage upon generation of plasma in the plasma generator.

12. The exhaust emission control device according to claim 4, further comprising judging means configured for determining whether fuel addition is required or not through monitoring at least either of current and voltage upon generation of plasma in the plasma generator.

13. The exhaust emission control device according to claim 5, further comprising judging means configured for determining whether fuel addition is required or not through monitoring at least either of current and voltage upon generation of plasma in the plasma generator.

14. The exhaust emission control device according to claim 6, further comprising judging means configured for determining whether fuel addition is required or not through monitoring at least either of current and voltage upon generation of plasma in the plasma generator.

15. The exhaust emission control device according to claim 7, further comprising judging means configured for determining whether fuel addition is required or not through monitoring at least either of current and voltage upon generation of plasma in the plasma generator.

16. The exhaust emission control device according to claim 8, further comprising judging means configured for determining whether fuel addition is required or not through monitoring at least either of current and voltage upon generation of plasma in the plasma generator.

* * * * *